United States Patent [19]

Corby et al.

[11] 4,184,281
[45] Jan. 22, 1980

[54] LIVE BAIT WELL

[76] Inventors: Karl W. Corby; William H. Ogden, III, both of Ocean Reef Club, Key Largo, Fla. 33037; Harold London, 11141 SW. 40th Ct., Davie, Fla. 33328

[21] Appl. No.: 932,019

[22] Filed: Aug. 8, 1978

[51] Int. Cl.² ............................................. A01K 97/00
[52] U.S. Cl. .............................................. 43/57; 9/7; 297/192; 297/217
[58] Field of Search .................. 43/55, 56, 57, 54.5 R, 43/54.5 A; 297/217, 192, 193; 9/1.1, 7

[56] References Cited

U.S. PATENT DOCUMENTS

| | | | |
|---|---|---|---|
| 2,923,087 | 2/1960 | Cummings | 43/55 |
| 3,084,472 | 4/1963 | Feik | 43/55 |
| 3,193,966 | 7/1965 | Lawson | 43/57 |
| 3,212,210 | 10/1965 | Lawson | 43/55 |
| 3,220,140 | 11/1965 | Shirley | 43/55 |
| 3,315,403 | 4/1967 | Smith | 43/55 |
| 3,323,249 | 6/1967 | Randall | 43/57 |
| 3,797,160 | 3/1974 | Lewis | 43/55 |
| 3,822,498 | 7/1974 | Butler | 43/57 |
| 3,839,757 | 10/1974 | Grimes | 297/192 |
| 3,947,991 | 4/1976 | Morcom | 43/54.5 R |
| 4,008,500 | 2/1977 | Hall | 297/217 |
| 4,074,651 | 2/1978 | Arduser | 43/57 |
| 4,143,436 | 3/1979 | Jones | 9/7 |

Primary Examiner—James L. Jones, Jr.
Attorney, Agent, or Firm—Brady, O'Boyle & Gates

[57] ABSTRACT

Disclosed herein is a live bait well for a fishing vessel which occupies normally unusable space on the stern by being conveniently located beneath the main fisherman's chair. The bait well is comprised of a circular tub body with a segmented closable see-through top and having a concentric sleeve passing through the tub body to define an annular water compartment so that the entire assembly can be set in place to encircle the upright fisherman's chair support pedestal which is secured to the deck. Sea water is fed into the bottom of the tub body from remotely located pumps located in the machinery space below the main deck. The sea water is fed into the tub body in such a fashion that a unidirectional current is established in a circular pattern between the sleeve and the outer tub body wall. Overflow is drained off by means of a semi-cylindrical housing attached to the outer wall of the tub body and includes therein an overflow pipe of predetermined height which is adapted to feed excess water, above a level determined by the height of the overflow pipe, to a discharge line.

15 Claims, 8 Drawing Figures

LIVE BAIT WELL

BACKGROUND OF THE INVENTION

This invention relates generally to containers for live fishing bait and more particularly to an inboard live bait well for a fishing boat.

Both inboard and outboard live bait wells for fishing boats are well known. These bait wells, moreover, take various forms and configurations and are known to include such apparatus as water circulation devices and aerators. Typical examples of such bait wells are disclosed in the following prior art references developed during the course of a preliminary patent search made in the United States Patent and Trademark Office:

U.S. Pat. 3,084,472—Feik
U.S. Pat. 3,193,966—Lawson, et al.
U.S. Pat. 3,212,210—Schmelzer, Jr.
U.S. Pat. 3,220,140—Shirley, Sr.
U.S. Pat. 3,315,403—Smith
U.S. Pat. 3,323,249—Randall
U.S. Pat. 3,797,160—Lewis
U.S. Pat. 3,822,498—Butler
U.S. Pat. 4,074,651—Arduser In U.S. Pat. No. 3,212,210 there is disclosed a minnow bucket having a central support post which is secured to the bottom wall of the bucket and which has for its purpose the supporting of a pie-plate like strainer and to comprise one of the components of a semi-automatic aerating pipe.

In addition to the above, one other patent reference should be noted. The reference to be noted in U.S. Pat. 3,947,991—Morcum which is directed to a compartmentalized fishing tackle box, as opposed to a live bait well, and includes a plurality of stacked horizontal circular trays disposed in a lazy susan fashion within a circular housing. The trays are rotatable about a common vertical shaft in the housing with each tray having a cut out which matches the cut out in the top of the housing. When the cut out in the trays are aligned with the cut out in the housing, the walls of the trays completely close the opening in the side of the housing. Each of the trays may be rotated such that the contents of the trays are accessible through the cut out in the top of the housing. In one embodiment, the container has a vertical aperture which allows the container to be mounted over the shaft supporting the seat in a fishing boat.

SUMMARY

Accordingly, the present invention is directed to an improved inboard live bait well which is advantageously located beneath a fisherman's chair mounted upon a vertical chair support pedestal secured to the main deck of a fishing vessel. The live bait well of the present invention comprises a circular tub body with a segmented closable see-through top wich is rotatably secured to a concentric sleeve which passes through the tub body and is bonded to the bottom wall to define an annular water compartment. The entire assembly is slipped over and set in place about the chair support pedestal. The tub body additionally includes an input port located in the bottom wall which is adapted to direct the flow of feed water in a predetermined direction so as to set up a circular current in the tub body unidirectionally around the sleeve. A semi-circular housing is secured to the side wall of the tub body. The interior of the housing communicates with the water compartment by means of a plurality of vertically aligned holes in the tub side wall which is also adapted to include a filter screen. An overflow pipe of predetermined length to establish the depth of the water within the tub body is placed vertically in the housing and is coupled to an output line so as to carry excess water away from the tub body when the depth of the water is exceeded.

DESCRIPTION OF THE PREFERRED EMBODIMENT

Figure 1:
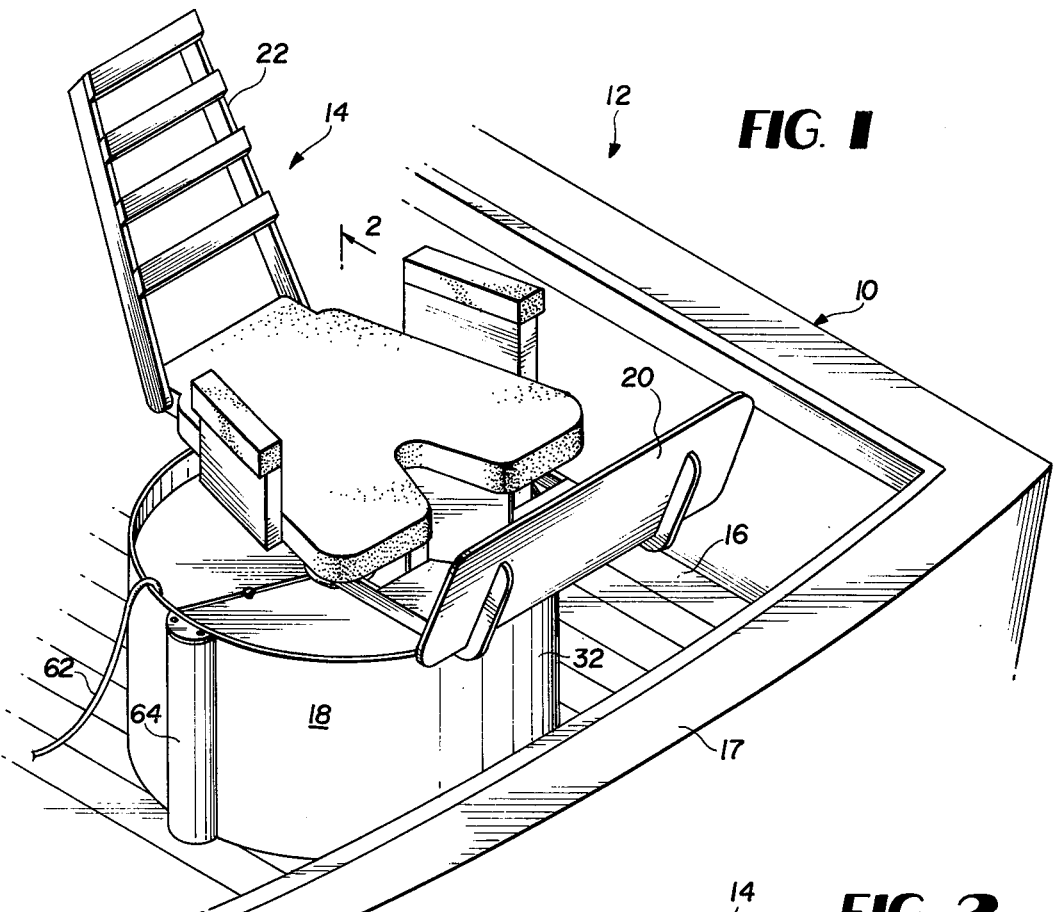
FIG. 1 is a perspective view partially in section disclosing the preferred embodiment of the subject invention located beneath a fisherman's chair located on the stern of a fishing vessel.

Referring now to the drawings and more particularly to FIG. 1, reference numeral 10 denotes the stern of a conventional deep sea fishing vessel or boat 12 having a fishing chair 14, sometimes referred to as a "fighting chair," located on the main deck 16 in front of the transom 17. Whereas prior art inboard live bait wells have occupied space on the deck 16 which could be put to other beneficial uses, the present invention comprises a circular type live bait well 18, which is located beneath the fishing chair 14 and having an outside diameter which does not extend beyond the lateral extension over the deck of the foot board 20 nor the back rest 22 of the chair. Such a configuration thereby occupies a space within the boat which is normally unused and which additionally permits the fisherman access to the bait well without his having to leave the immediate vicinity of the fishing chair 14, thus providing an advantage heretofore unobtainable with prior art apparatus.

Figure 2:
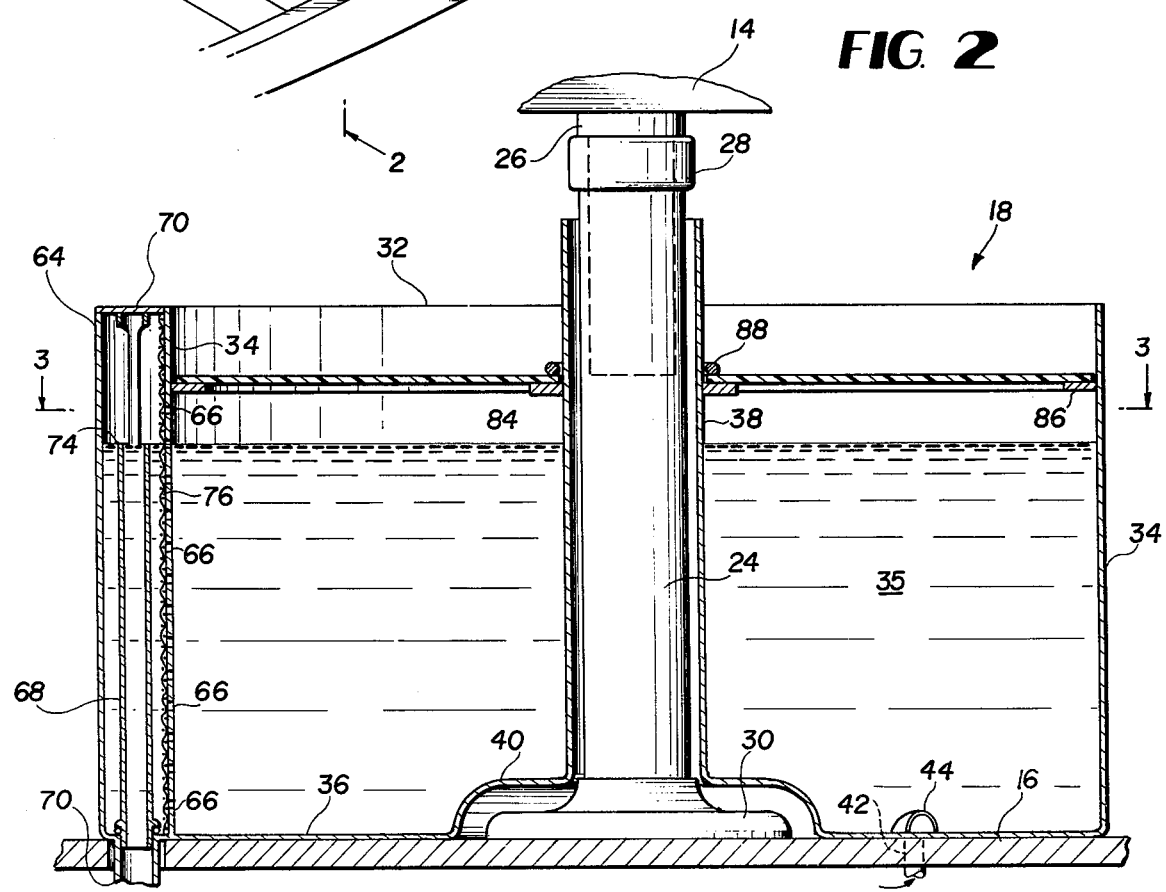
FIG. 2 is a cross-sectional view of the invention taken along the lines 2—2 of the embodiment shown in FIG. 1.
Figure 3:
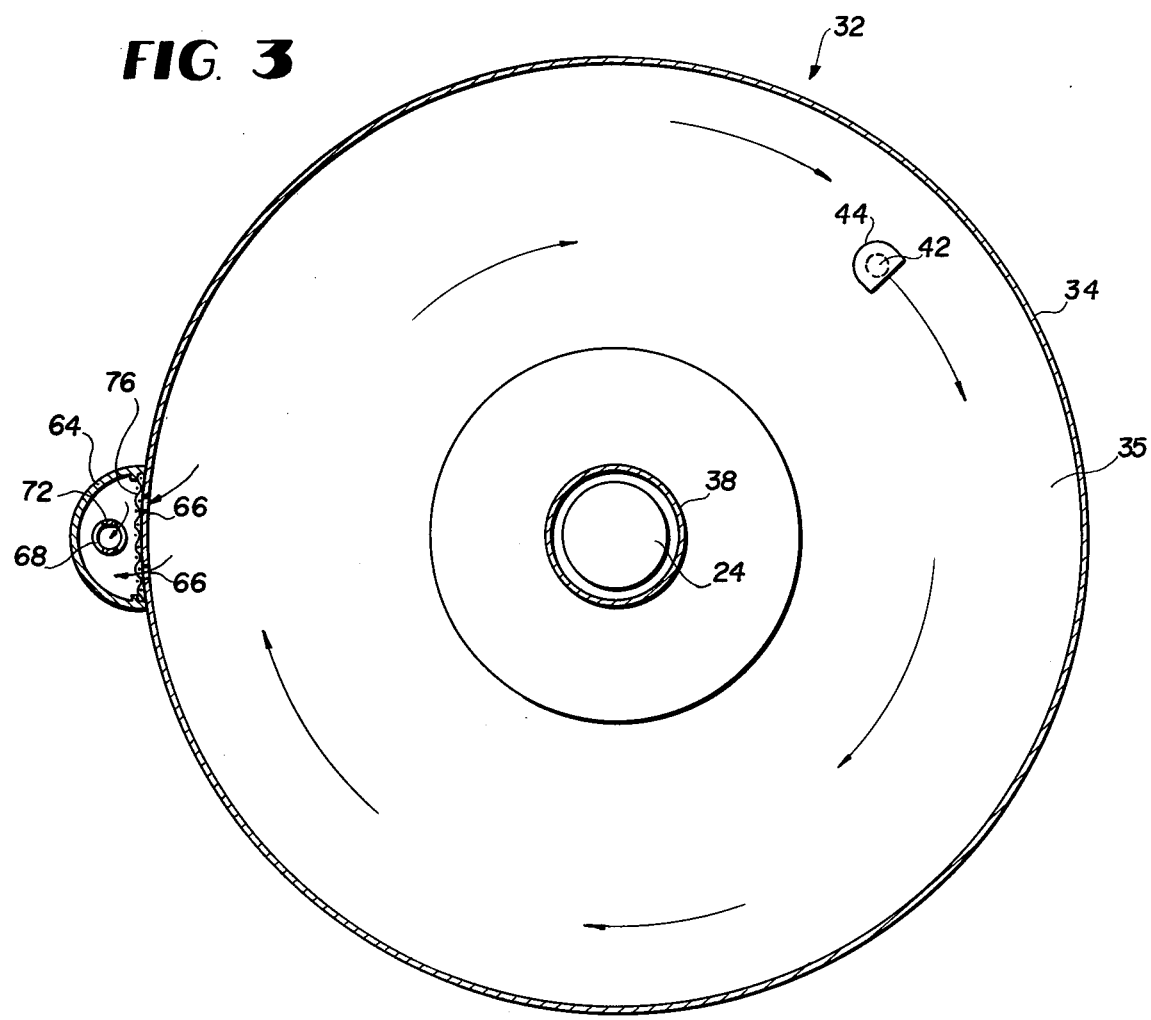
FIG. 3 is a cross-sectional view of the invention shown in FIG. 2 taken along the lines 3—3.

Proceeding now to the details of the live bait well 18 according to the subject invention, reference is now made to FIG. 2. The fishing chair 14 is mounted on the main deck 16 by means of a vertical cylindrical pedestal 24 which includes a bore at its upper extremity for receiving the downwardly projecting shaft 26 forming a part of the chair base. The pedestal 24 additionally includes a collar 28 at its upper end which is adapted to provide a bearing surface for the base of the fishing chair 14. At its lower end, the pedestal 24 terminates in an enlarged circular base 30 which is adapted to be anchored to the deck 16 by conventional fastener means, not shown.

The bait well 18 includes a tub body 32 which is circular in cross section and has a side wall 34 of predetermined height and a bottom wall 36. The tub body 32 is constructed, for example, of metal and is adapted to encircle the pedestal 24. To that end a concentric metal sleeve 38 having an inner dimension which is greater than the outer dimension of the collar 28 is welded to a concave portion 40 of the bottom wall 36 which is adapted to clear the pedestal base 30. The sleeve 38 and the concave portion 40 thus provide a central opening through the entire body portion 32 so that an annular water compartment 35 is provided. The entire assembly can be easily set in place and removed from the pedestal 24 when the chair 14 is removed.

Figure 4:
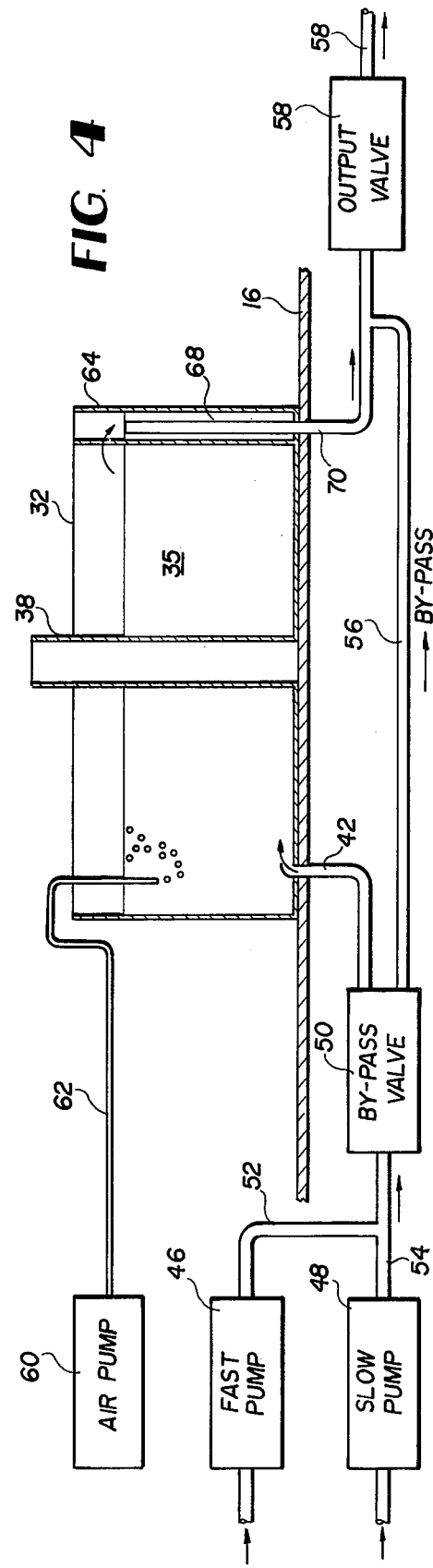
FIG. 4 is a block diagram illustrative of the overall bait well system according to the subject invention.

When in place, as shown in FIGS. 1 and 2, sea water, for example, is fed from a remote pump as shown in FIG. 4 to an input line 42 where it comes up through the main deck and couples to an input port 44 located in the bottom wall 36 of the tub body 32. The input port 44 is oriented such that the stream of water fed into the water compartment 35 is not directed either radially or upwardly, but rather is directed tangentially with respect to the side wall 34 so as to generate a unidirectional current within the circumference of the side wall 34 and the sleeve 38. This is of particular importance since it is desirable and in some cases necessary that the live bait contained therein be kept active and forced to swim in the current thus generated.

The water within the tub body 32 i.e. in the water compartment 35, is fed for example by either a fast feed pump 46 or a slow feed pump 48 located below the deck 16 and are adapted to be coupled to a sea water input not shown. Both pumps 46 and 48 commonly couple to a by-pass valve 50 by means of respective lines 52 and 54. The by-pass valve 50 is also located below the deck 16 and is manually operable to permit all of the sea water fed thereto to be passed to the input line 42 or a portion, when desirable, may be coupled to a by-pass line 56 which couples to an output valve 58. The output valve connects to an output, not shown, via a discharge line 58. Also, when desirable, aeration is provided for the water contained in water compartment 35 of the bait well by means of an air pump 60 which is coupled to an air hose 62 which is then fed into the top of the tub body 32.

Figure 6:
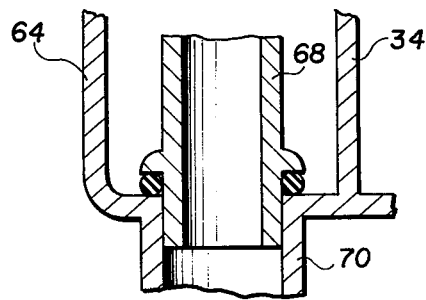
FIG. 6 is a partial cross-sectional view illustrative of the lower portion of the overflow pipe.
Figure 5:
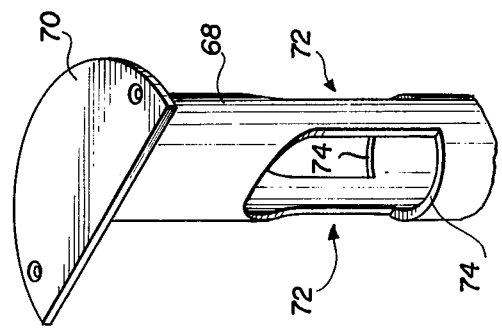
FIG. 5 is a perspective view partially in section of the upper portion of the overflow pipe shown in FIG. 2.

In order to maintain the depth of the water within the water compartment 35 at a constant level, there is also provided means for preventing overflow. This means comprises a semi-circular metal housing 64, which is secured to the outer surface of the side wall 34 and which extends the entire height of the side wall 34. At the location of the housing 64, there is provided a plurality of vertically aligned holes 66 in the side wall 34 so that water may pass from the water compartment 35 into the interior of the housing 64. A vertically oriented overflow pipe member 68 having a length substantially equal to the height of the side wall 34 is secured to a semi-circular cover 70 as shown in FIG. 5 and is adapted to be inserted into the housing 64 so that it couples to an output line 70 shown in FIG. 6. The overflow pipe 68 is fashioned to include a pair of open segments or slots 72 in the upper portion thereof so that when the overflow pipe is in position within the housing 64, the water level can rise to the location of the lower lip portions 74 of the slots 72 at which time the sea water will spill over into the vertical pipe 68 and be discharged.

In order that debris or other matter circulating in the water within the tub body not clog the openings 72 to the overflow pipe 68, a screen member 76 is provided in the housing 64 behind the holes 66. The screen 76 is of any conventional type, and preferably comprises a unitary piece of screening that extends from top to bottom and which can be easily removed when the overflow pipe 68 and cover 70 are lifted from the housing 64.

Figure 8:
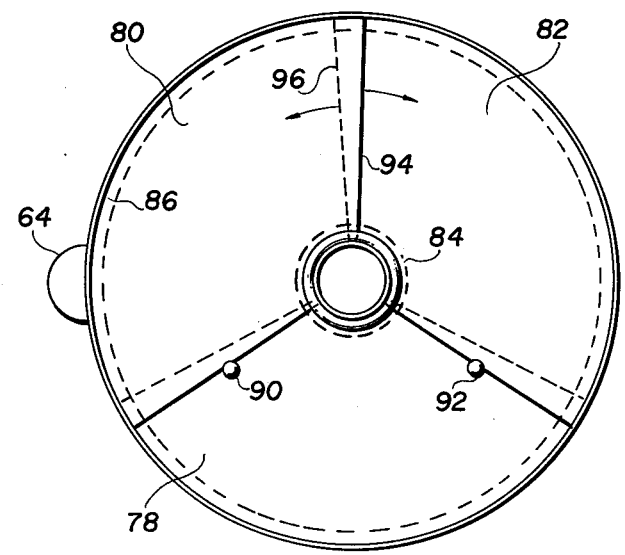
FIG. 8 is a top plan view illustrative of the arrangement of the cover panels for the subject invention.
Figure 7:
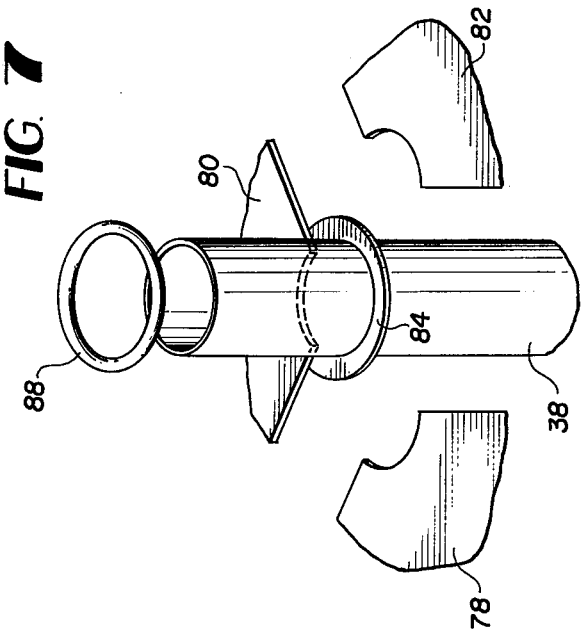
FIG. 7 is an exploded view partially in section disclosing the details of the construction of the elements forming the see-through cover for the subject invention.

The live bait well according to the subject invention additionally includes a transparent cover assembly at the top of the tub body 32 which in addition to being shown in FIG. 2, is shown in detail in FIGS. 7 and 8. The cover assembly is comprised of three overlapping pie-shaped segments 78, 80 and 82 which are adapted to extend outwardly from a retaining collar 84 secured to the sleeve 38 to a circular rim 86 secured to the inner surface of the upper part of the side wall 34. An O-ring member 88 fits over the sleeve 38 to contact the uppermost closure member 80. The closure member 78 includes a pair of upwardly projecting stops 90 and 92 as shown in FIG. 8 which permits closure member 80 to be rotated clockwise until the forward edge 94 abuts the stop 92 while the closure member 82 is adapted to be rotated counterclockwise until the forward edge 96 abuts the stop 90.

Thus what has been shown and described is a unique live bait well which consists of a circular tub body with a segmented closable see-through top cover and including a centrally located sleeve through the tub body so that the entire configuration can be slipped over and set in place around the upright pedestal upon which the fishing chair is mounted.

Having thus disclosed what is considered to be the preferred embodiment of the subject invention,

We claim as our invention:

1. An inboard bait well adapted to be positioned in place around a substantially vertical deck mounted pedestal which is utilized, for example, to support a fishing chair on a fishing vessel, the combination comprising:
   a tub body having side and bottom walls and including a concentric sleeve through the bottom wall to provide a water compartment therein, said sleeve having an inside dimension at least as great as the outside dimension of said pedestal so as to allow the tub body to be set in place around said pedestal;
   input means for feeding water into said water compartment;
   output means for discharging water therefrom; and
   means establishing a predetermined constant depth of water in said water compartment, which means additionally includes means for coupling overflow water to said output means.

2. The bait well as defined by claim 1 wherein said tub body is generally circular in cross section, and wherein said water compartment comprises an annular water compartment.

3. The bait well as defined by claim 2 wherein said sleeve and said pedestal have substantially like cross sections.

4. The bait well as defined by claim 1 wherein said sleeve and said pedestal are generally circular in cross section and said sleeve extends at least to the top of said tub body.

5. The bait well as defined by claim 1 wherein said tub body is located beneath a fishing chair having a predetermined lateral extension over the deck of said vessel and wherein said tub body is generally circular in configuration and having an outer dimension which is less than the lateral extension of said fishing chair.

6. The bait well as defined by claim 1 and additionally including a cover assembly mounted on said tub body to provide top access to said water compartment.

7. The bait well as defined by claim 6 wherein said cover assembly includes at least one movable portion which is slidably rotatable about said sleeve to provide said top access to said water compartment.

8. The bait well as defined by claim 6 wherein said cover assembly comprises a plurality of flat planar pie-shaped segments overlapping one another, one of which at least is slidably rotatable around said sleeve to provide said access into said water compartment.

9. The bait well as defined by claim 1 wherein said means for feeding water into said water compartment includes an input port located on said bottom wall.

10. The bait well as defined by claim 9 wherein said input port is selectively oriented to direct the incoming water into said water compartment in a predetermined direction to establish a unidirectional current flow within said annular water compartment.

11. The bait well as defined by claim 1 wherein said means for maintaining the water at said predetermined constant depth comprises a hollow housing on said side wall, said side wall having a plurality of vertically positioned openings at the location of said housing to permit water to flow into the interior of said housing from said water compartment and additionally including an overflow pipe, having at least one opening at its upper end corresponding to said predetermined depth, said overflow pipe being held in place within said housing and having its lower end coupled to said output means.

12. The bait well as defined by claim 11 wherein said at least one opening comprises a pipe segment removed from said pipe at said predetermined depth.

13. The bait well as defined by claim 11 and additionally including a sediment screen positioned adjacent said vertically positioned openings.

14. The bait well as defined by claim 11 wherein said housing is semi-cylindrical and having the length dimension substantially equal to the height of the side wall of said body.

15. The bait well as defined by claim 14 wherein said housing additionally includes a semicircular top cover which is connected to the upper end of said overflow pipe and which is adapted to hold said overflow pipe vertically in position within the interior of said housing.

* * * * *